(12) United States Patent
Argyriou (10) Patent No.: US 8,619,644 B2
(45) Date of Patent: Dec. 31, 2013

(54) ROBUST CODING IN MULTI-HOP NETWORKS

(75) Inventor: Antonios Argyriou, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 428 days.

(21) Appl. No.: 12/919,524

(22) PCT Filed: Mar. 12, 2009

(86) PCT No.: PCT/IB2009/051028
§ 371 (c)(1),
(2), (4) Date: Aug. 26, 2010

(87) PCT Pub. No.: WO2009/113031
PCT Pub. Date: Sep. 17, 2009

(65) Prior Publication Data
US 2010/0329227 A1    Dec. 30, 2010

(30) Foreign Application Priority Data

Mar. 14, 2008   (EP) .................................... 08152731

(51) Int. Cl.
*H04B 7/00* (2006.01)

(52) U.S. Cl.
USPC ...................................................... 370/310

(58) Field of Classification Search
USPC ...................................................... 370/338
See application file for complete search history.

(56) References Cited

U.S. PATENT DOCUMENTS 7,710,908 B2   5/2010   Larsson et al.
2005/0220145 A1*   10/2005   Nishibayashi et al. ....... 370/474

FOREIGN PATENT DOCUMENTS

WO   2006120650 A1   11/2006
WO   2007008123 A1   1/2007

OTHER PUBLICATIONS

Navid Nikaein et al, "topology Management for Improving Routing and Network Performances in Mobile Ad Hoc Networks", Mobile Networks and applications,2004,pp. 584-594.*
Shunyu Hu et al, "provisioning quality controlled medium access in Ultra Wideband Operated WPANs", IEEE Communications Society,2006,12 pages.*
Sachin Katti, "The importance of being opportunistic:Practical Network Coding for Wireless Environments", Jan. 1, 2007; 10 pages.*
Hiroyuki Yomo et al., Opportunistic scheduling for wireless network coding,Jun. 24-28, 2007, pp. 5610-5615,Aalborg University.*
Peter Larsson et al, "Multi-User ARQ" IEEE 2006, Ericsson Research Stockholm, Sweden, pp. 2052-2057.
Yingbin Zhang et al, "Dynamic Scheduling Model for Realtime Appications in Manet", IEEE, 2006, 5 Pages.
Jian Zhang et al, "Adaptive MAC Scheduling Using Channel State Diversity for Wireless Networks", IEEE 2006, 4 Pages.
Jianfeng Wang et al, "Opportunistic Packet Scheduling and Media Access Control for Wireless LANs and Multi-Hop Ad Hoc Networks", IEEE Communications Society, 2004, pp. 1234-1239.

(Continued)

*Primary Examiner* — Mark Rinehart
*Assistant Examiner* — Maharishi Khirodhar (57) ABSTRACT

A method and apparatus make use of a multiple receiver frame aggregation for creating data units so that they require acknowledgment of a single packet data unit by a group of several intended receivers. A multi-hop topology information regarding the neighborhood of a destination node can be used to derive the intended receivers which acknowledge a packet transmission besides the primary destination node of the packet.

14 Claims, 6 Drawing Sheets

```
input  : Network node X, Beacon Group (BG), Extended Beacon Group (EBG)
output : Optimal Receiving Group (ORG)
2.1   foreach i ∈ BG do
2.2      For all the nodes in the beacon group of X;
2.3      foreach j ∈ EBG do
2.4         //For all the nodes in the extended beacon group of X;
2.5         if EBG(X, i) → j ∪ BG ≠ ∅ then
2.6            //Then node j is reachable (can overhear) both from nodes X and i;
2.7            //add it to the optimal receiving group for packets of node X;
2.8            ORG(X, i) ← ORG(X, i) ∪ { j };
2.9         end
2.10     end
2.11  end
2.12  Any packet that must be transmitted from node X to node i must be received by nodes ∈ ORG(X, i).
2.13  foreach l' ∈ Queue(X) do
2.14     //Coding decision for next packet in queue l';
2.15     decode_nodes ← 0;
2.16     foreach i ∈ BG do
2.17        //For all the neighbors of node X;
2.18        if (ORG(X, i → prevhop) ∩ ORG(X, l' → prevhop)) ≠ ∅ then
2.19           // The node of the ∩ can decode l ⊕ l' since it has l;
2.20           decode_nodes + +;
2.21        end
2.22     end
2.23     if (decode_nodes > 1) then
2.24        l' = l ⊕ l';
2.25     end
2.26     transmit l';
2.27  end
```

(56) References Cited

OTHER PUBLICATIONS

Jongwon Yoon, et al, "Maximizing Differentiated Throughput in IEEE 802.11E Wireless LANs", IEEE 2006, pp. 411-417.

Minyoung Sung et al, "A MAC Parameter Optimization Scheme for IEEE 802.11E-Based Multimedia Home Networks", IEEE Communications Society, 2006, pp. 390-394.

Joe Naoum-Sawaya et al, "Adaptive Approach for QoS Support in IEEE 802.11E Wireless LAN", IEEE 2005, 7 Pages.

Kenich Kawamura et al, "A Priority Control Method for Wireless Multi-Hop Access Using IEEE 802.11 DCF Mechanism", IEEE 2004, pp. 520-524.

Mohammad Malli et al, "Adaptive Fair Channel Allocation for QoS Enhancement in IEEE 802.11 Wireless LANs", IEEE Communications Society 2004, pp. 3470-3475.

L. Raju et al, "Beacon Assisted Discovery Protocol (BEAD) for Self-Organizing Hierarchical Ad-Hoc Networks", IEEE Communications Society, Globecom 2004, pp. 1676-1680.

Jingyao Zhang,"Network Coding Withlow Complexity in Wireless Ad-Hoc Multicast Networks", IEEE Communications Society, 2006, pp. 3699-3704.

Sachin Katti, "The Importance of Being Opportunistic: Practical Network Coding for Wirelss Environments", XP003016298, Retrieved From the Internet: URL:http://ww.cl.cam.ac.uk/{wh214/research/papers/allerton05.pdf, Jan. 1, 2007; 10 Pages.

Sachin Katti", XORs in the Air: Practical Wireless Network Coding", Proceedings of ACM SIGCOMM, Sep. 2006, 12 Pages.

Navid Nikaein et al, "Topology Management for Improving Routing and Network Performances in Mobile Ad Hoc Networks", Mobile Networks and Applications, 2004, pp. 584-594.

Chunyu Hu et al, "Provisioning Quality Controlled Medium Access in Ultra Wide Band-Operated WPANs", IEEE Communications Society, 2006, 12 Pages.

Javier Del Prado Pavon et all, "The MBOOA-WIMEDIA Specification for Ultra Wideeband Distributed Networks", IEEE Communications Magazine, 44(6), pp. 128-134, Jun. 2006.

Stefan Mangold et al, "IEEE 802.11e/802.11k Wireless LAN: Spectrum Awaremenss for Distributed Resource Sharing", John Wiley and Sons, Chichester, Dec. 2004, pp. 881-902.

\* cited by examiner

```
input  : Network node X, Beacon Group (BG), Extended Beacon Group (EBG)
output : Optimal Receiving Group (ORG)

2.1   foreach i ∈ BG do
2.2       // For all the nodes in the beacon group of X;
2.3       foreach j ∈ EBG do
2.4           //For all the nodes in the extended beacon group of X;
2.5           if EBG(X, i) → j ∪ BG ≠ ∅  then
2.6               //Then node j is reachable (can overhear) both from nodes X and i;
2.7               //add it to the optimal receiving group for packets of node X;
2.8               ORG(X, i) ← ORG(X, i) ∪ {j};
2.9           end
2.10      end
2.11  end
2.12  Any packet that must be transmitted from node X to node i must be received by nodes ∈ ORG(X, i).
2.13  foreach l' ∈ Queue(X) do
2.14      //Coding decision for next packet in queue l';
2.15      decode_nodes ← 0;
2.16      foreach i ∈ BG do
2.17          //For all the neighbors of node X;
2.18          if (ORG(X, l' → prevhop) ∩ ORG(X, l'' → prevhop)) ≠ ∅  then
2.19              // The node of the ∩ can decode l ⊕ l'' since it has l';
2.20              decode_nodes ++;
2.21          end
2.22      end
2.23      if (decode_nodes > 1) then
2.24          l'' = l ⊕ l';
2.25      end
2.26      transmit l';
2.27  end
```

ROBUST CODING IN MULTI-HOP NETWORKS

FIELD OF THE INVENTION

The present invention generally relates to a transmitting apparatus, a receiving apparatus, a system and a method of performing multi-user transmission to a plurality of other transmission ends in a transmission systems such as—but not restricted to—a wireless local area network (WLAN).

BACKGROUND OF THE INVENTION

Wireless local area networks (WLANs) as defined e.g. in the IEEE 802.11 specifications are almost omnipresent today. The increase of throughput of the available channel was one major issue, and research has been focused on improving the modulation and coding within the physical protocol layer.

According to the 802.11 standard, wireless nodes or stations implement a distributed coordination function (DCF) which is a form of carrier sense multiple access with collision avoidance (CSMA/CA). CSMA/CA is a contention-based protocol making certain that all stations first sense the medium before transmitting. The main goal is to avoid having stations transmit at the same time, which results in collisions and corresponding retransmissions. If a station wanting to send a frame senses energy above a specific threshold on the medium (which could mean the transmission of another station), the station wanting access will wait until the medium is idle before transmitting the frame. The collision avoidance aspect of the protocol pertains to the use of acknowledgements that a receiving station sends to the sending station to verify error-free reception. Although somewhat more complex, this process of accessing the medium can be seen as a meeting where everyone is polite and each person only speaks when no one else is talking. In addition, participants who understand what the person is saying nod their head in agreement.

In a randomly operating backoff procedure, a station with a data packet to transmit generates a random number between 0 and a contention window (CW) size, which determines the duration of the backoff timer as counted in number of timeslots. The CW has a minimum starting value of 15, doubles after a collision, can rise up to 1023, and is decremented after a successful transfer, indicated by an acknowledgement (ACK) frame. After detecting the medium free for the duration of DCF Inter-Frame Space (DIFS), the mobile station counts down the backoff timer until it reaches zero and then starts its transmission. If during the countdown another mobile station occupies the medium, all mobile stations in backoff interrupt their count down and defer until they detect the medium free for at least DIFS. The standard includes an optional Request-to-Send (RTS)—Clear-to-Send (CTS) handshake prior to the transmission.

Recently, a combining of network coding with broadcast has been applied in 802.11-based multi-hop wireless networks to increase information content per transmission, and throughput benefits have been demonstrated for data applications.

Figure 1:
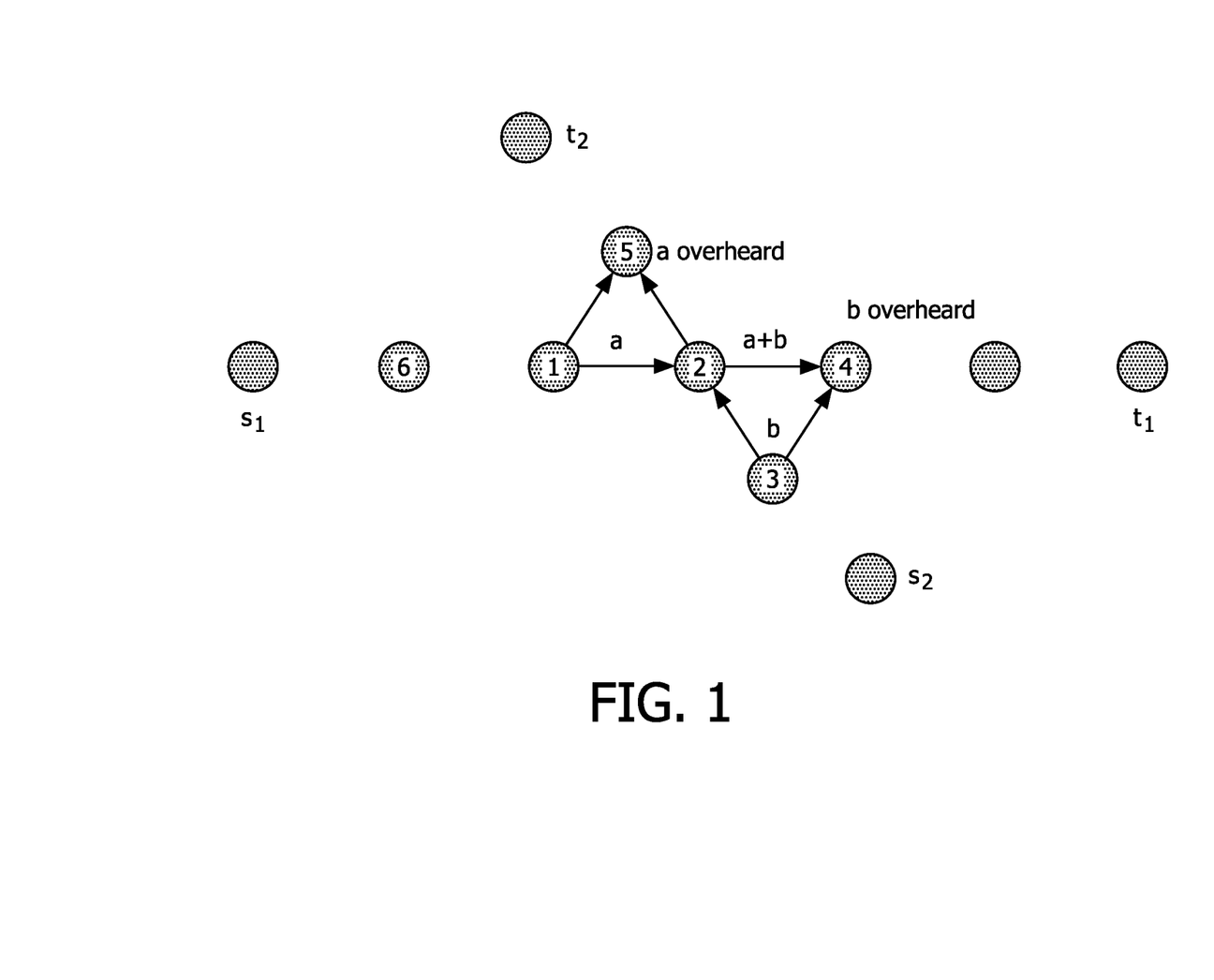
FIG. 1 shows a schematic network topology of several wireless nodes in a wireless multi-hop network.

FIG. 1 schematically depicts a topology of several wireless nodes. In the scenario presented in this figure, according to routing tables provided at each node, nodes 1 and 3 need to transmit their packets a and b to nodes 4 and 5, respectively. Node 2 has to act as a forwarder of these packet since nodes 4 and 5 are not radio range of node 1. According to the basic principle of network coding, node 2 broadcasts a coded packet (e.g. a⊕b), instead of forwarding packet a to node 4, and packet b to node 5. In this way, both nodes 4 and 5 can decode their original packet with just one broadcast transmission at the physical layer from node 2, instead of two dedicated transmissions. This can lead to a higher throughput. However, the practical schemes that have been proposed based on this principle, employ opportunistic coding and transmission of packets, which means that they are not robust for integration over existing Media Access Control (MAC) protocols. Furthermore, they require cross-layer interactions between the MAC and routing protocols that hamper the potential for clean solutions.

In a so-called "opportunistic approach" to network coding, a wireless node relies on local information to detect and exploit coding opportunities in real-time. If nodes participate in opportunistic listening, they snoop on all communications they hear over the wireless medium. The nodes may also annotate packets they send to tell their neighbours which packets they have heard. When a node sends, it may use its knowledge of what its neighbours have received to perform opportunistic coding, which could mean that the node can combine (e.g. XOR, "⊕") multiple packets and send them in a single transmission if each intended receiver has enough information to decode its packet.

However, a problem that current wireless network coding schemes are faced with, is that nodes opportunistically overhear transmissions of packets not intended for them. For example in FIG. 1, node 1 transmits packet a that is intended for node 2, but it is overheard by node 5 who is in radio range of node 1 (and in radio range of node 2). However, with existing MAC protocols, nodes that are not the intended receivers (e.g. node 5 in FIG. 1) cannot acknowledge correct reception of overheard packets. This means that the node that employs a network coding algorithm (e.g. node 2 in FIG. 1), cannot know if the coding decisions it has made is the correct one. Incorrect coding decisions lead eventually to lower throughput which is far from the theoretically possible with network coding.

In Sachin Katti et al., "XORs in The Air: Practical Wireless Network Coding", SIGCOMM, 2006, asynchronous out-of-band acknowledgments are proposed as a way to solve the above problem. However, with this approach, when a node decides which packets to code, it must still use a stochastic approach in order to estimate the fate of overheard packets. Clearly, this is not a viable approach for practical adoption of network coding.

Furthermore, another important problem is the hidden node problem. Consider for example that node 1 in FIG. 1 is transmitting packet a. However, node t2 is out of the radio range of node 1. If the MAC protocol is using a contention-based mechanism (like 802.11 DCF or the contention-based mechanism in WiMedia MAC), then node t2 will transmit a packet that will collide with the transmission of packet a from node 1. However, if node 5 is an opportunistic receiver and does not acknowledge the transmission, neither node 1 or 2 will know that it did not receive the packet. This fact disables node 2 from knowing deterministically what is the optimal coding decision it must make, regardless of the employed algorithm.

SUMMARY OF THE INVENTION

It is an object of the present invention to provide a more robust coding scheme for wireless multi-hop networks.

Accordingly, overall system throughput can be increased, as a packet that has to be received by several intended receivers can only be sent once. Moreover, transmission of a single packet data unit can reduce the fields required for describing the intended receivers, and cross-layer information from routing protocols is not required. Multiple receiver packets can thus be constructed in such a way that optimal coding decisions can be made by the network coding function.

The apparatus may be implemented as a processor device, module, chip, chip set or circuitry provided in a network rode or station. The processor may be controlled by computer program product comprising code means for performing the steps of the above method claim when run on a computer or processor device.

According to a first aspect, the multi-hop topology information may be derived by a beaconing procedure. In a specific example, the multi-hop topology information may comprise a beacon group of immediate neighbours of a destination node, and an extended beacon group of neighbour nodes of at least one node of said beacon group. Hence, the above problem of topology inference can be solved by exploiting a beaconing procedure which may be already available in the existing media access control protocol.

According to a second aspect which can be combined with the above first aspect, the group of receiving nodes may be determined based on a first condition which requires that a potential receiving node had received a previously transmitted packet, and a second condition which requires at least one additional potential receiving node capable of decoding a packet to be transmitted. Thus, network coding is not based on probabilistic criteria but rather on deterministic knowledge about the fate of previously transmitted packets.

According to a third aspect which can be combined with any one or both of the above first and second aspects, at least one channel access parameter may be dynamically configured in accordance with an information content of a packet to be transmitted. Thereby, network coding can be exploited in an extended way and system throughput is maximized. In an exemplary implementation, the at least one channel access parameter may comprise at least one of a contention window size and an arbitration inter frame space.

According to a fourth aspect which can be combined with any one or all of the above first to third aspects, the at least one channel access parameter may be dynamically configured by estimating throughput as a function of a predetermined traffic class. This approach enables selection of parameter values based on an analytical model for optimal performance.

According to a fifth aspect which can be combined with any one or all of the above first to fourth aspects, the at least one channel access parameter may be dynamically configured by using a look-up table which stores pre-defined values of said at least one channel access parameter. This provides the advantage that optimal values derived from comprehensive experiments can be stored in advance.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

In the following, preferred embodiments are described on the basis of a wireless multi-hop network topology as shown for example in FIG. 1.

To address the aforementioned problems in a systematic fashion, a network coding scheme is proposed, which can facilitate optimal coding decisions by any linear network coding algorithm.

More specifically, a multiple receiver (MR) frame aggregation is proposed for packing a data unit, e.g., a MAC protocol data unit (MPDUs), into a single physical layer packet data unit (PPDU), so that acknowledgment of a single MPDU by at least two receivers is required. This MR aggregation scheme is specifically designed for cases where the same packet is destined to receivers with different MAC addresses.

Additionally, a two-hop or multi-hop topology information regarding the neighborhood of a network node is used in order to solve the problem of topology inference at MAC level. This topology information may be derived by using a distributed beaconing procedure, such as the beaconing procedure available in existing MAC protocols. In such a beaconing procedure, each node may periodically transmit a beacon to the broadcast MAC address, containing its identifier (e.g. Internet Protocol (IP) address) and position. Upon not receiving a beacon for longer than a time-out interval, a router assumes that either the neighbor has failed or has moved out and deletes that entry from its table.

Furthermore, a procedure is needed at each node that decides what nodes should acknowledge a packet transmission besides the primary destination node of the packet. This procedure essentially "constructs" the MR packets in such a way that optimal coding decisions can be made by the network coding algorithm. Then, actual network coding is performed based on the coding decisions. Thereby, construction of an optimal MR packets is guaranteed. The benefit of the proposed procedure is that it is not based on probabilistic criteria but rather on deterministic knowledge regarding the fate of previously transmitted packets.

Figure 2:
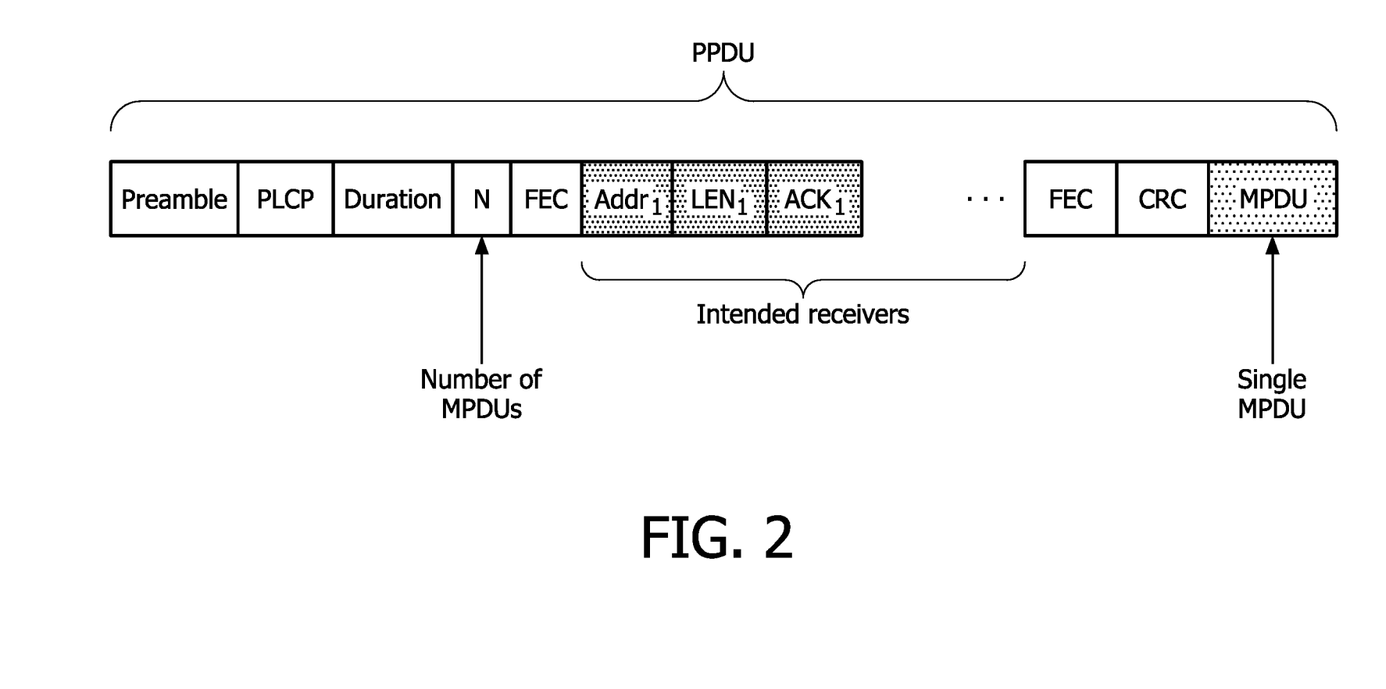
FIG. 2 shows a frame aggregation structure according to an embodiment.

FIG. 2 shows a schematic frame structure of a PPDU according to an embodiment, for several intended receivers and a single MPDU. This frame structure may be based for example on the frame structure described in N. Sai Shankar et al. "Cooperative communication MAC (CMAC)—a new MAC protocol for next generation wireless LANs", International Conference on Wireless Networks, Communications and Mobile Computing, 2005. Due to the transmission of a single MPDU, the fields required for describing intended receivers can be reduced. More specifically, the frame structure comprises a preamble followed by a PLCP header, a duration field, a field N which specifies the number of conveyed MPDUs, a forward error correction (FEC) field, address, length (LEN) and acknowledgement (ACK) fields of the intended receivers, another FEC field, a cyclic redundancy code (CRC) field and the conveyed MPDU.

Thus, in the proposed frame structure of FIG. 2, multiple intended receivers are specified in the PPDU, while only a single MPDU exists as payload. The benefit of this frame structure, is that while the group of receivers that should acknowledge the MPDU is notified, the packet that has to be received by all the intended receivers is only transmitted once (to the primary receiving node and the opportunistic ones).

This, however, is not a reliable multicast transmission, which means that upon receiving a coded packet, and after decoding, the node should not pass to higher layer packets not intended for the particular node.

The receiving node knows the identification (ID) of the data packet it decoded by a header that should be added in the data packet. While existing schemes use headers of nearly 50 bytes, the proposed embodiment requires significantly smaller coding/packet headers since it operates below the IP level.

However, when the proposed MR aggregation is employed, a sender must specify the network nodes that must actually send back acknowledgements, besides the primary receiver that is supposed to according to the routing protocol. The procedure that will make this decision will essentially populate the tuples named intended receivers, as depicted in FIG. 2. In order to calculate an optimal group receivers, a distributed beaconing procedure may be applied since it is available in emerging wireless MAC protocols and can be used to develop a robust procedure for topology inference. In such a distributed beaconing procedure, each channel may be logically divided into recurring superframes that begin with a slotted beacon period followed by a data transfer period. During the beacon period, each node transmits a beacon in its designated time slot. Beacons may contain information about scheduled quiet periods, spectrum measurements, and multi-channel reservation for data communication. Once the beacon period is over, nodes may switch to other channels.

Based on FIG. 1, an advantage of the beaconing procedure and its use for maintaining different groups of nodes we will now be explained. It is assumed that node 1 of FIG. 1 knows about its immediate neighbours (i.e. beacon group). But all the neighbours in nodes 1's beacon group (BG), inform node 1 about their neighbours. The union of these last two sets of nodes may form an extended beacon group (EBG). For example in FIG. 1, besides the obvious beacon groups, the extended beacon groups for nodes 1 and 2 are given as follows:

BG(1)={6; 5; 2}
EBG(1)=6→{s1}; 5→{t2}; 2→{5; 4; 3}

The last notation means that node 1 knows that node's 5 direct neighbour are nodes 2 and t2 and that node's 2 direct neighbours are nodes 5, 4, and 3. The above knowledge regarding the BG and EBG of a node, is key for creating the optimal group of intended receivers in an outgoing MR packet. This optimal receiving group (ORG) at a node, is created for each particular destination. When packets are intended for a "primary" destination node, the optimal receiving group denotes the group of nodes that must overhear this packet transmission. In order to explain how this group is populated, it is referred back to FIG. 1. From the EBG that node 1 maintains, it knows that node 5 can also hear transmissions from node 2. Therefore, node 5 can acquire opportunistically the packet a that node 1 wants to transmit to node 2. This means that node 2 should also acknowledge packet a. The reason for this action is that any upcoming coding decisions/transmissions that will be made by node 2 will also be overhead by node 5. It is therefore an opportunity for node 5 to receive packet a and allow node 2 to use it for coding decisions. With this approach nodes know precisely what packets have been overheard. It is noted also that with this scheme, node 6 is excluded from acknowledging packet a, since it is not useful for that node. Here we should stress out that this decision can be achieved without requiring cross-layer information from the routing protocols.

Figure 3:
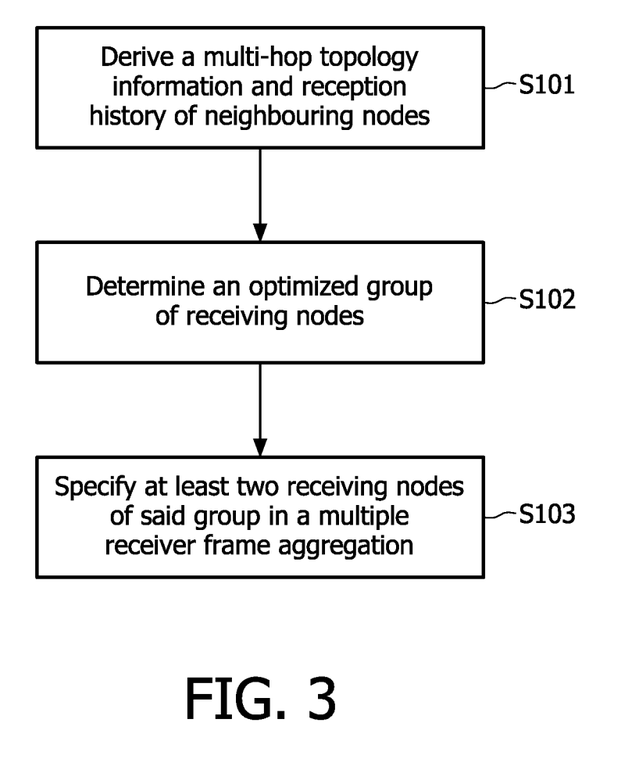
FIG. 3 shows a schematic flow diagram of selection procedure according to an embodiment.

FIG. 3 shows a general flow diagram of a network coding scheme according to an embodiments. In an initial step S101, a multi-hop topology information is derived e.g. by the above beaconing procedure or any other suitable procedure for deriving information about neighbouring nodes. Additionally, a reception history about preceding packets of the neighbouring nodes is derived. Then, an optimized group of receiving nodes is determined in step S102 based on the topology information and the reception history. Finally, in step S103, at least two receiving nodes of the determined group are specified as intended receivers in an MR frame aggregation scheme.

Figure 4:
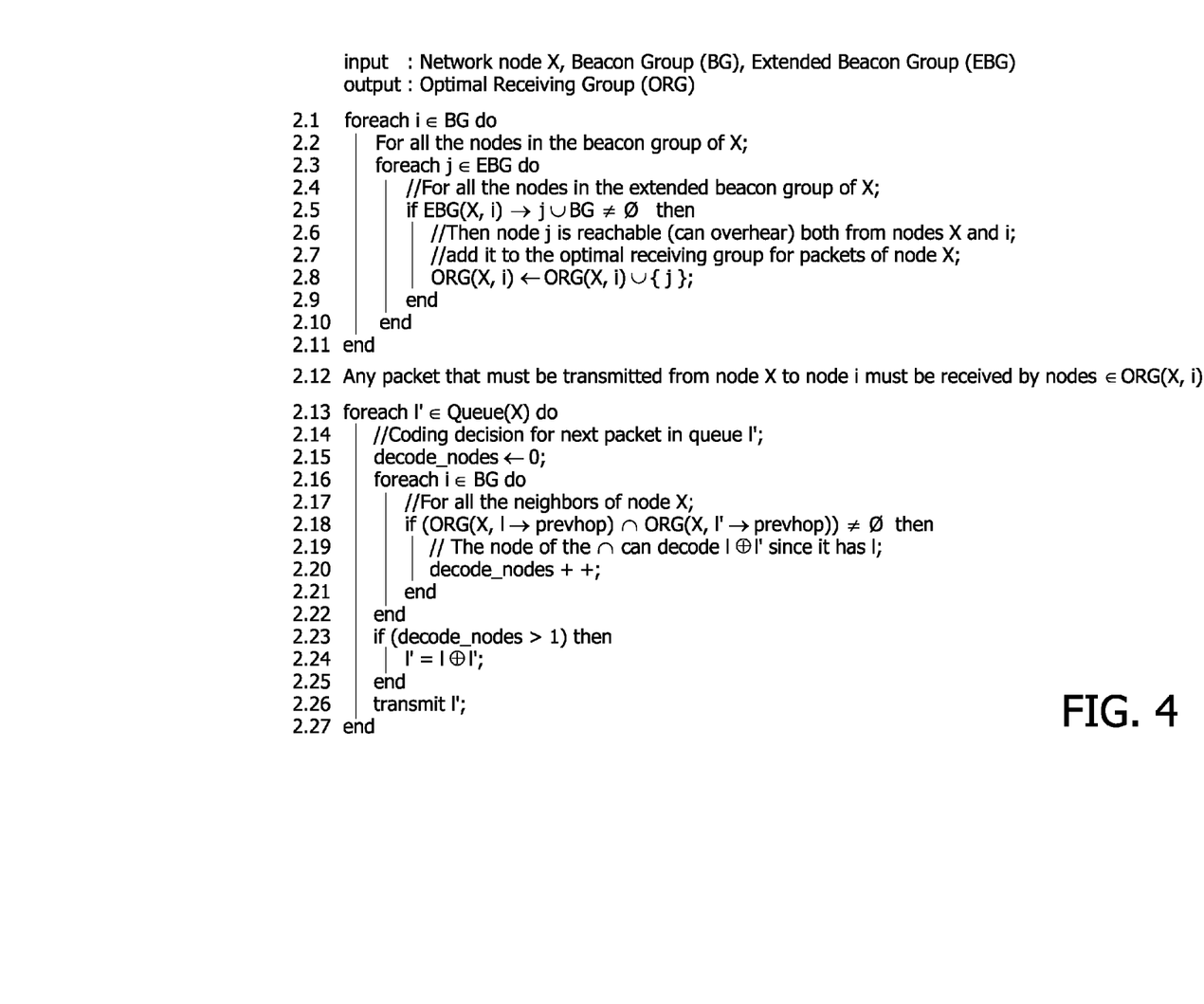
FIG. 4 shows an exemplary calculation scheme for calculating an optimal receiving group according to an embodiment.

FIG. 4 shows a more detailed example of a calculation or software procedure for calculating the above mentioned optimal receiving group at each node. The actual network coding procedure is presented in the lower part of FIG. 4. In that part, a variable decode_nodes maintains the number of nodes that could decode the packet currently considered for coding. Input parameters of the procedure are the target node X, the BG and the EBG of the target node X. Output of the procedure should be an optimal receiving group (ORG). The first if-condition (step 2.18) of the lower coding loop, checks which node in the neighbourhood had received the previously transmitted packet l, and can therefore decode a coded version of the current packet considered for transmission l'. It is noted that in general it is assumed and always true that ORG(k; l)==ORG(l; k).

The second conditional if-statement (step 2.23) of the lower coding loop checks whether it is worth coding this packet. This is needed since if just one node can decode a coded version of packet l', then there is no reason for coding it in the first place.

The above coding procedure addresses a fundamental issue in emerging wireless multi-hop networks, that is increase of the overall system throughput. More specifically, high data-rate applications that operate in mesh or ad-hoc wireless local area networks of high density will benefit significantly. The proposed coding procedure or mechanism can be implemented on top of existing protocols like the WiMedia MAC, as described for example in J. Prado del Pavon et al., "The MBOA-WiMedia specification for ultra wideband distributed networks", IEEE Communications Magazine, 44(6):128-134, June 2006.

In mobile or wireless opportunistic networks, opportunistic communications links can be setup when a pair of nodes move into the radio range of each other. The above network coding procedure can be used to exploit this broadcast nature of the wireless channel, for maximizing the information rate in the network.

However, interactions between opportunistic network coding and medium access protocols may still be improved. In order for wireless network coding to be embedded into real wireless systems and standards, a set of basic mechanisms and algorithms must be devised in order to be able to enforce the above optimized coding decisions at the MAC layer. In the following embodiment, appropriate transmission and prioritization of coded/non-coded packets on the wireless medium will be dealt with.

Enhanced distributed channel access (EDCA) is a completely distributed service differentiation mechanism that was initially defined as part of the specification 802.11e. However, it was recently adopted by the WiMedia MAC in order to provide service differentiation is contention-based medium access. In EDCA, medium access is granted by using a contention-based mechanism while prioritization of different traffic classes is achieved by two configurable parameters: the contention window size (CW) and the arbitration inter frame space (AIFS). The contention window size determines the number of back-off slots a station has to count down before a transmission attempt can be made. The AIFS value determines the number of slots that has to be sensed idle before the back-off procedure is initialized/resumed. Packets and nodes that have been assigned to different classes/priorities are configured with different parameter values in order to increase/decrease their chance of gaining access to the wireless medium.

One of the basic problems with the existing EDCA scheme is that it provides service differentiation based on the assumption that packet transmissions have the same impact on the system throughput regardless of the node they originate. However, a successful packet transmission from any traffic type may contribute in the same way to the overall system throughput. For example voice over IP (VoIP) packets are assigned to a high priority EDCA service class, while best effort web traffic is assigned to a lower class. This is a valid assumption in traditional wireless networks where the nodes only forward packets. However, when linearly coded packets are transmitted, then the above statement may not hold since packets no longer have the same information content.

Referring back to the simple topology of a distributed wireless ad-hoc network as shown in FIG. 1, it is initially considered that node 1 transmits a packet of size d to node 2. Upon successful transmission, node 1 will initiate back-off according to the DCF or EDCA algorithms. Then the channel will be captured from the node which backoff timer expires first. In case node 2 is obtaining access to the channel and transmits another packet named c. According to our scenario, the channel will be captured next by node 3 that transmits packet b to node 2. Now if network coding is applied, node 2 should transmit a coded packet (i.e. a⊕b). However, if the typical 802.11 DCF mechanism is employed, node 2 will not be granted access, at least until nodes 4 and 5 transmit, and it will most likely be after node 1 transmits again. This introduces unacceptable delay. If now EDCA is employed, all nodes that belong to the same contention class (which is probably the case for similar traffic types according to the 802.11e/WiMedia specifications), will contend for the medium as with DCF.

In order to highlight the impact on performance, it is considered for example that node 2 has a coded packet that can result in successful decoding of packets both at nodes 3 and 4. Therefore, node 2 should essentially have priority over the medium access so that the other nodes can decode faster the required packets. The aforementioned situation represents the reality today, i.e., MAC protocols that are not engineered for robust inter-operation with network coding. With the advent of network coding, existing adaptation approaches are not only sub-optimal but they may worsen significantly the system performance if employed heuristically.

In order to highlight the impact on performance, it is considered for example that node 2 has a coded packet that can result in successful decoding of packets both at nodes 3 and 4. Therefore, node 2 should essentially have priority over the medium access so that the other nodes can decode faster the required packets. The aforementioned situation represents the reality today, i.e., MAC protocols that are not engineered for robust inter-operation with network coding. With the advent of network coding, existing adaptation approaches are not only sub-optimal but they may worsen significantly the system performance it employed heuristically.

A robust service differentiation mechanism for network coding can be achieved by using the above optimized coding procedure, so that each node knows precisely the neighbouring nodes that can overhear transmissions and from which nodes. Moreover, the number of packets that can be decoded by a single transmission of a single MPDU at the MAC layer can be determined. Additionally, to address the aforementioned problems in a systematic fashion, a service differentiation approach is proposed, that can be employed e.g. at the MAC layer. More specifically, a procedure is proposed for dynamically configuring the EDCA parameters of each node (e.g. AIFS and CW).

Overall, the information rate across the system should be maximized. Fairness among nodes takes a whole new meaning, since the information rate is intended to be proportionally allocated the between node transmissions and not just the data rate.

In the above coding procedure of FIG. 4, the parameter decodable_nodes was used to denote the number of neighbours of a node that can decode a native packet upon successful transmission. For notational convenience, this parameter is now denoted c(l), in order to indicate how many nodes can decode a packet l. Essentially this quantity can be regarded as the information content of packet l. Furthermore, a parameter Nj denotes the number of nodes that belong to class j, while a parameter $n_j$ denotes the aggregate data rate achieved by all nodes of that class j.

According to the embodiment, the information flow in the network is maximized, while proportional access fairness is also provided to different EDCA classes. Therefore, a key difference is that the information flow is proportional (which means that the data rate between nodes is disproportional). In the face of network coding, each class j must receive the following ratio of the system bandwidth:

$$e_j = \frac{\eta_j \tilde{c}_j(l)}{N_j}, \tag{1}$$

where č j(l) denotes the information content for the packet l currently considered for transmission at a node of class j. Therefore, the question is how to optimally configure the contention window (CW) for the next transmission event given that the information content of the current packet is č j(l). There are several ways to do that. A first one is supported by an analytical model and a second one is a heuristic approach that essentially assigns to the parameters AIFS and CW a value from a set of statically configured values, according to the information content of each packet.

First, the analytically-driven CW adaptation is described, i.e. the contention window can be selected based on a closed-form solution. Essentially any model that estimates the throughput as a function of a particular class j could be used. As an example, the optimal contention window can be selected following an approach described in C. Hu et al., "Provisioning Quality Controlled Medium Access in Ultra-Wide Band-Operated WPANs," in WCNC, 2006.

$$CW_j^* = \frac{\sqrt{2\beta T_d'}}{r_j} + 1, \tag{2}$$

This equation can be expanded to:

$$CW_j^* = \frac{\sqrt{2\left(\left(\sum_{j=1}^{M} N_j r_j\right)^2 + \sum_{j=1}^{M} N_j r_j^2\right) T_D / t_s}}{r_j} + 1 \tag{3}$$

It is however noted that the aforementioned model is not binding. The proposed CW adaptation could as well be based on the approach described in G. Hiertz, et al., "IEEE 802.11e/802.11k Wireless LAN—Spectrum Awareness for Distributed Resource Sharing", John Wiley and Sons, Chichester, December 2004. It is however proposed that the adaptation should be based on the following equation at the packet level:

$$CW_j^*(l) = \frac{\sqrt{2\left(\left(\sum_{j=1}^{M} N_j e_j\right)^2 + \sum_{j=1}^{M} N_j e_j^2\right) T_D / t_s}}{e_j} + 1 \quad (4)$$

This modified equation essentially captures the proposal of the present embodiment, i.e. adaptation should happen by considering the information content of each packet and not just its size.

The alternative static approach can be based on a lookup table (LUT) for statically configuring optimal values of the parameters AIFS and CW. The actual values that will populate the LUT can be derived from the previous analytical model or similar approaches. Furthermore, the packet size can also be easily accounted for in the performance model and in a possible LUT. In case the proposed scheme is standardized, a group of optimal values could be pre-defined for different operational areas after comprehensive experiments are carried out.

Figure 5:
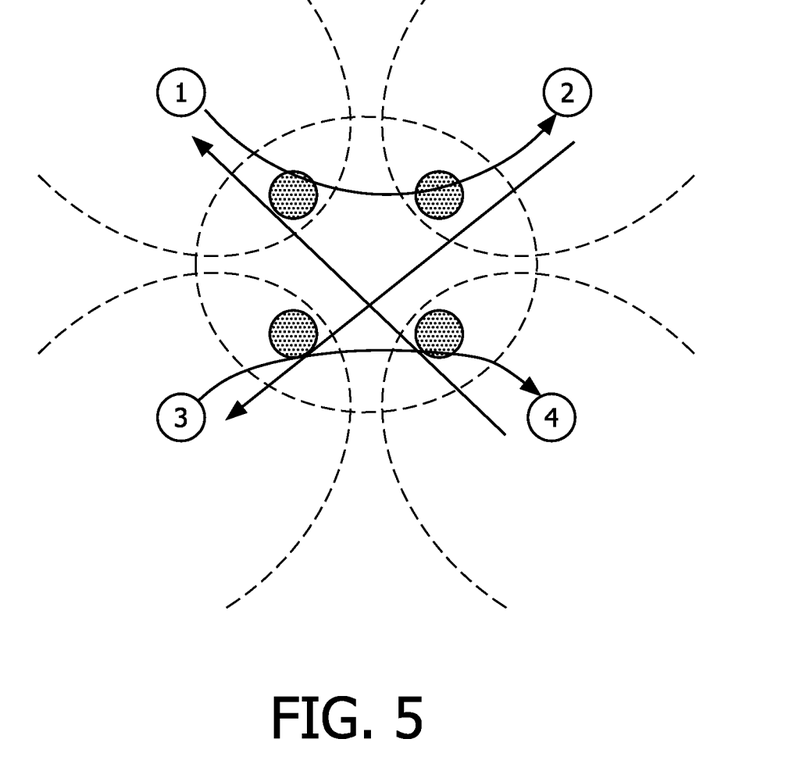
FIG. 5 shows another schematic network topology with core nodes and edge nodes.

FIG. 5 shows a schematic topology used for an analytical evaluation of the proposed adaptation scheme. Four packet flows exist in the network. The dashed lines indicate wireless coverage areas. This topology includes four "core" nodes (indicated as dark circular areas) that can hear each other and are located at the center of the overall topology. At the edges there are four other "edge" nodes 1 to 4 that have wireless connectivity only with one of the central nodes. Four packet flows exist in the network (indicated as straight and bent arrows) and their direction is also highlighted in FIG. 5. This topology is used to show benefits of the proposed scheme in a dense network. For the analytical evaluation only two EDCA traffic classes 1 and 2 are defined. Furthermore, to test the impact of an increased number of nodes, their number has been varied as follows. When a single node was added to the "core" nodes, another "edge" node was added as well.

Figure 6:
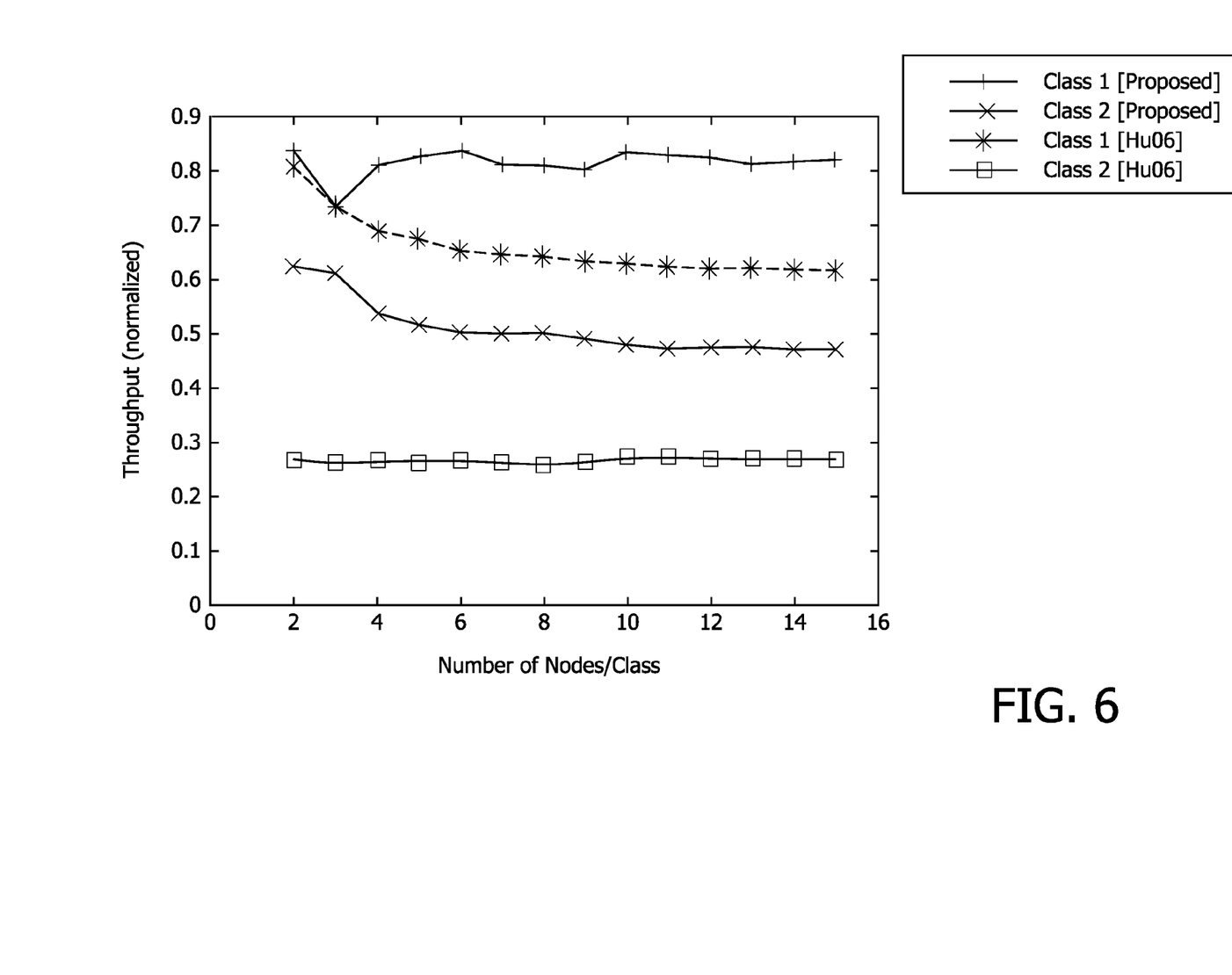
FIG. 6 shows analytical results of normalized throughput versus number of nodes for different traffic classes.

FIG. 6 shows analytical results of normalized overall throughput versus number of nodes for the two different EDCA traffic classes 1 and 2. The results are compared in FIG. 6 with a proposal for improved QoS at the Wimedia MAC-layer, as described in C. Hu et al., "Provisioning Quality Controlled Medium Access in UltraWide Band-Operated WPANs," in WCNC, 2006. It is noted that the proposal already significantly improves the performance over the vanilla Wimedia MAC, which makes the significant throughput increase that can be achieved with the proposed scheme even more important. Even higher throughput gains can be expected as both the number of packet flows and involved hosts is increased.

The above embodiments taken alone or in combination can provide a robust protocol for considerably higher throughput in dense and saturated wireless mesh or ad-hoc networks.

Therefore, they can be used either for low data rate applications based on ultra wideband (UWB) networks (e.g. sensors) or high data rate applications (e.g. wireless multimedia home entertainment systems).

In summary, a method and apparatus for broadcasting packet data in a multi-hop wireless network have been describe, wherein a multi-hop topology information of a target node is derived, a group of receiving nodes is determined based on the multi-hop topology information, and at least two receiving nodes of said group are specified in a multiple receiver frame aggregation for packing data units.

It is noted that the present invention is not restricted to the above embodiments and can be used for any multi-hop packet network environment which allows MR frame aggregation. More specifically, the invention is applicable to all types of WLANs.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill the functions of several items recited in the claims. The mere fact that certain measures are recited in mutually different dependent claims does not indicate that a combination of these measures cannot be used to advantage. A computer program used for controlling processor to perform the claimed features may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An apparatus for broadcasting packet data by a sender node to a destination node multi-hop wireless network, said apparatus comprising:
   a memory storing instructions; and
   a processor which, when the instructions are executed by the processor, configure the processor:
   to derive a multi-hop topology information of a target node;
   derive a reception history of neighboring nodes of a selected node;
   to determine a group of receiving nodes based on said multi-hop topology information and the reception history; and
   to specify at least two receiving nodes of said group in a multiple receiver frame aggregation for packing data units, wherein the at least two specified receiving nodes and the destination node must send back acknowledgements to the sender node.

2. The apparatus according to claim 1, wherein said processor is further configured to derive said multi-hop topology information by a beaconing procedure.

3. The apparatus according to claim 2, wherein said multi-hop topology information comprises a beacon group of immediate neighbors of a destination node, and an extended beacon group of neighbor nodes of at least one node of said beacon group.

4. The apparatus according to claim 1, wherein said processor is further configured to determine said group of receiving nodes based on a first condition which requires that a potential receiving node had received a previously transmitted packet, and a second condition which requires at least one additional potential receiving node capable of decoding a packet to be transmitted.

5. The apparatus according to claim 1, wherein said processor is further configured to dynamically configure at least one channel access parameter in accordance with an information content of a packet to be transmitted.

6. The apparatus according to claim 5, wherein said at least one channel access parameter comprises at least one of a contention window size and an arbitration inter frame space.

7. The apparatus according to claim 5, wherein said processor is further configured to dynamically configure said at least one channel access parameter by estimating throughput as a function of a predetermined traffic class.

8. The apparatus according to claim 5, wherein said processor is further configured to dynamically configure said at least one channel access parameter by using a look-up table which stores pre-defined values of said at least one channel access parameter.

9. A system for broadcast transmission in a multi-hop network, said system comprising at least two network nodes each having an apparatus according to claim 1.

10. The apparatus of claim 1, wherein the processor is further configured to includes addresses of the at least two specified receiving nodes in a packet sent by the sender.

11. A method of broadcasting packet data by a sender node to a destination node in a multi-hop wireless network, said method comprising the acts of:
deriving by a processor a multi-hop topology information of a target node;
deriving a reception history of neighboring nodes of a selected node;
determining a group of receiving nodes based on said multi-hop topology information and the reception history;
specifying at least two receiving nodes of said group in a multiple receiver frame aggregation for packing data units; and
the at least two specified receiving nodes and the destination node sending back acknowledgements to the sender node.

12. The method of claim 11, wherein the specifying act includes the act of including addresses of the at least two specified receiving nodes in a packet sent by the sender.

13. A non-transitory computer readable medium comprising computer instructions which, when executed by a processor, configure the processor to perform the acts of:
deriving a multi-hop topology information of a target node;
deriving a reception history of neighboring nodes of a selected node;
determining a group of receiving nodes based on said multi-hop topology information and the reception history;
specifying at least two receiving nodes of said group in a multiple receiver frame aggregation for packing data units; and
the at least two specified receiving nodes and the destination node sending back acknowledgements to the sender node.

14. The non-transitory computer readable medium of claim 13, wherein the specifying act includes the act of including addresses of the at least two specified receiving nodes in a packet sent by the sender.

* * * * *